(12) United States Patent
Engler et al.

(10) Patent No.: US 6,741,158 B2
(45) Date of Patent: May 25, 2004

(54) MAGNETICALLY SENSED THERMOSTAT CONTROL

(75) Inventors: Kevin J. Engler, Freeport, IL (US); Thomas M. Moyer, Freeport, IL (US); Gregory J. Ottens, Freeport, IL (US); Thomas R. Giuffre, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 88 days.

(21) Appl. No.: 10/199,167

(22) Filed: Jul. 18, 2002

(65) Prior Publication Data
US 2004/0012477 A1 Jan. 22, 2004

(51) Int. Cl.$^7$ .............................. H01H 37/56; G01B 7/30
(52) U.S. Cl. ...................... 337/344; 337/366; 324/207.2
(58) Field of Search ............................... 337/54, 90, 98, 337/134, 344, 366; 324/207.2, 207.21, 251, 117 H

(56) References Cited

U.S. PATENT DOCUMENTS

| | | | |
|---|---|---|---|
| 1,749,392 A | | 3/1930 | Penn |
| 1,867,756 A | | 7/1932 | Penn |
| 2,539,259 A | | 1/1951 | McCabe |
| 2,641,664 A | | 6/1953 | Knutson |
| 2,782,278 A | | 2/1957 | Peters |
| 3,171,003 A | | 2/1965 | Larsen |
| 3,190,988 A | | 6/1965 | Graham et al. |
| 3,222,474 A | | 12/1965 | Fasola, Jr. |
| 3,573,698 A | | 4/1971 | Mitick |
| 3,593,236 A | | 7/1971 | Beck |
| 3,656,082 A | | 4/1972 | Beck |
| 3,660,795 A | * | 5/1972 | Kobayashi ................ 338/32 H |
| 3,750,068 A | | 7/1973 | Hallin |
| 3,869,619 A | | 3/1975 | Camillo |
| 3,905,003 A | | 9/1975 | Rosenberg et al. |
| 4,243,967 A | | 1/1981 | Frank |
| 4,266,211 A | | 5/1981 | Ulanet |
| 4,274,072 A | | 6/1981 | Gustafson |
| 4,356,478 A | * | 10/1982 | Muggli et al. ............... 340/593 |
| 4,414,520 A | | 11/1983 | Ruuth |
| 4,456,169 A | * | 6/1984 | Martin ....................... 236/78 D |
| 4,661,807 A | * | 4/1987 | Panaro ........................ 340/638 |
| 4,681,729 A | * | 7/1987 | Pendleton et al. ........... 376/247 |
| 4,706,073 A | * | 11/1987 | Vila Masot .................. 340/639 |
| 4,748,432 A | | 5/1988 | Yamada |
| 5,148,142 A | | 9/1992 | Buckshaw et al. |
| 5,166,657 A | | 11/1992 | Buckshaw et al. |
| 5,194,842 A | | 3/1993 | Lau et al. |
| 5,262,752 A | | 11/1993 | Truong et al. |
| 6,040,749 A | | 3/2000 | Youngner et al. |
| 6,104,592 A | * | 8/2000 | Pohl ........................... 361/139 |
| 6,246,305 B1 | | 6/2001 | Youngner et al. |
| 6,279,832 B1 | * | 8/2001 | Duchatelet et al. ........ 236/78 D |
| 6,467,697 B2 | * | 10/2002 | Duchatelet et al. ........ 236/78 D |
| 2002/0027166 A1 | * | 3/2002 | Duchatelet et al. ........ 236/78 R |

FOREIGN PATENT DOCUMENTS

DE                19707729 A1  *  8/1997         ............ H01H/9/16

OTHER PUBLICATIONS

Honeywell Inc. "Thermostats T87F," publication, Form No. 60–2222–2, S.M. Rev. 4–86.

Honeywell Inc., "T87F Universal Thermostat," publication, Form No. 60–0830–3, S.M. Rev. 8–93.

* cited by examiner

Primary Examiner—Anatoly Vortman

(57) ABSTRACT

Methods and apparatuses for magnetically detecting a temperature change for thermostat control thereof are disclosed. A thermostat control device can be configured to include at least one bi-metallic strip that is configured to experience a change in angular position in response to a temperature change. The thermostat control device is generally associated with a Hall sensor, which includes a plurality of magnets that can experience movement relative to the Hall sensor in response to the change in the angular position of the bi-metallic strip. The temperature change can then be automatically and/or electrically detected in response to the movement of the magnets, wherein the temperature change is utilized for thermostat control thereof.

20 Claims, 3 Drawing Sheets

MAGNETICALLY SENSED THERMOSTAT CONTROL

TECHNICAL FIELD

The present invention is generally related to sensor methods and devices. The present invention is also related to temperature sensing methods and devices. The present invention is additionally related to thermostat control devices. The present invention is further related to magnetic sensor methods and devices. The present invention also relates to switching methods and devices, particularly thermostat control switching devices thereof.

BACKGROUND OF THE INVENTION

Thermostat control devices are often utilized in heating and cooling systems in buildings, homes, and industrial applications such as power plants. Thermostat control devices are required, for example, to control power to a furnace or air conditioner blower motor, which is typically an AC induction motor. In heating, ventilation and air-conditioning (HVAC) systems, such as home air conditioning systems, it is often desirable to change the fan speed or blower speed to control the amount of airflow through the system's evaporator coil. In addition, in the initial operation in an air conditioning mode, the blower operates at high speed to pump conditioned air, especially to higher floors. Then, when the comfort space or living space has cooled down, the fan speed can be reduced to avoid blowing cold air directly on human occupants.

A number of electrical switching applications require mechanical switches that are both efficient and reliable. These requirements arise commonly in electromechanical thermostats utilized in the thermostat control of heating and cooling systems in homes and buildings indicated above. In such configurations, coils of standard bi-metallic strips can form the switch actuation elements. For many years this thermostatic switching function has been performed by mercury bulb switch elements. Thermostat control devices in use today generally operate utilizing a bi-metallic strip that changes angularity with temperature, tilting a mercury switch so that the mercury can move to make or break contacts, using the self leveling nature of the mercury itself.

One of the problems associated with mercury-based switching devices is the mercury itself, which presents a number of dangerous environmental hazards, as well as danger to humans and animals. Mercury-based thermostat switching devices have been under heavy scrutiny from environmentalists to eliminate the use of mercury. Thus, it is only a matter of time before mercury-based thermostat switching devices fall entirely out of favor. An alternative solution must be found, particularly because it is anticipated that the use of mercury will soon be banned entirely.

Other solutions have included finding a replacement for mercury or employing metallic spheres rolling in a glass tube to come into contact with switching electrodes, imitating a mercury switch, although not very successfully. Other attempts have involved replacing the mercury switch with a reed switch. This particular approach has resulted in a number of accuracy problems. Other solutions have included the use of snap-action devices.

Snap-action switches have been utilized as control devices. The term "snap-action switch" generally refers to a low actuation force switch, which can utilize an internal mechanical apparatus to rapidly shift or snap the movable contact from one position to another to make or break electrical conduction between the movable contact and a fixed contact in response to moving an operating element of the switch, such as a plunger, a lever, a spring, or the like from a first to a second position. Typically, these switches require only a few millimeters of movement by the operating element to change the conduction state of the switch. Such switches generally operate at a current level of several amperes using the standard 24 VAC power which thermostats control.

When actuated by a low and slow actuation force, however, such as is provided by a thermostat's coiled bi-metallic strip, snap-action switches can occasionally hang in a state between the two conducting states, or can switch so slowly between the two conducting states that unacceptable arcing can occur when entering the non-conducting state. Either condition can give rise to unacceptable reliability and predictability of operation. Furthermore, these switches frequently have unacceptably large differentials. Current switches also contain a heating circuit that actually changes the bi-metallic strip by adding heat to it. The amount of heat applied is generally adjustable by use of an adjustable wire-wound resistor. In this sense, such devices do not truly respond to a change based on the room temperature. Additionally, mercury-based devices exhibit a weight problem associated with the use of mercury, which can affect the sensitivity of the device. The present inventors have thus recognized that a need exists for a temperature-sensitive switching device that responds directly to room air temperature, and one that also avoids the weight and environmental issues associated with mercury.

Based on the foregoing, the present inventors have concluded that a solution to such problems can be achieved through the use of Hall-effect sensors, which are sensor devices that operate according to the Hall effect. The Hall effect is well known in the magnetic sensing arts. Hall-effect sensors are typically based on the utilization of a Hall generator, which generally comprises a magnetic field-dependent semiconductor whose function rests on the effect discovered by Edwin Hall. This effect, known as the "Hall effect" is caused by the Lorentz force, which acts on moving charge carriers in a magnetic field. The Hall effect occurs when the charge carriers moving through a material experience a deflection because of an applied magnetic field. This deflection results in a measurable potential difference across the side of the material, which is transverse to the magnetic field and the current direction.

One of the first practical applications of the Hall effect was as a microwave power sensor in the 1950s. With the later development of the semiconductor industry and its increased ability for mass production, it became feasible to use Hall effect components in high volume products. Honeywell International Inc. ("Honeywell"), a company headquartered in Morristown, N.J., for example, has been a leader in Hall effect applications. In 1968, Honeywell's MICROSWITCH division produced a solid-state keyboard using the Hall effect. The Hall-effect sensing element and its associated electronic circuit are often combined in a single integrated circuit to form a Hall-effect sensor thereof. Note that the term "Hall-effect sensor" and "Hall sensor" are generally utilized interchangeably to refer to the same type of device. Thus, Hall sensors are well known in the magnetic sensing arts.

In the simplest form of a Hall sensor, a Hall element can be constructed from a thin sheet of conductive material with output connections perpendicular to the direction of electrical current flow. When subjected to a magnetic field, the Hall-effect element responds with an output voltage that is proportional to the magnetic field strength. The combination of a Hall-effect element in association with its associated signal conditioning and amplifying electronics is sometimes called a Hall-effect transducer.

A number of types of Hall-effect sensors are currently utilized in commercial, consumer and industrial applications. Honeywell, for example, produces a family of solid-state position sensors that include digital and analog Hall-effect position sensors, magnetoresistive digital sensors, Hall-effect vane sensors, gear tooth sensors, Hall-effect basic switch, and various types of magnets thereof. Such solid state position sensors are reliable, high speed, long life, sensors that are directly compatible with other electronic circuits. These sensors respond to the presence or the interruption of a magnetic field by producing either a digital or an analog output proportional to the magnetic field strength. Digital and analog "sensor-only" devices are operated by the magnetic field from a permanent magnet or electromagnet.

The actuation mode associated with such sensors depends generally on the type of magnets used. Either a vane passing through a gap or a magnet mounted on a plastic plunger, for example, can operate integral magnet position sensors. Such position sensors can be implemented in accordance with applications that require accurate, reliable outputs. They are found in brushless DC motors, utility meters, welding equipment, vending machines, home appliances, computers, and so on. Typical applications include ignition timing, power, sensing, valve positioning, robotics control, current sensing, linear or rotary motion detection, length measurement, flow sensing, RPM sensing, and security systems.

The present invention disclosed herein thus offers a unique solution to the problems associated with conventional thermostat control devices, particularly those devices which are mercury-based. The present invention essentially eliminates the need for a mercury switch by replacing the switching and temperature components thereof with an electro-mechanical solution.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide improved sensor methods and devices.

It is, therefore, another aspect of the present invention to provide a temperature sensing method and apparatus.

It is yet another aspect of the present invention to provide a thermostat control device, including a method and apparatus thereof.

It is yet another aspect of the present invention to provide a magnetic sensor method and apparatus.

The above and other aspects of the invention can be achieved as is now described. Methods and devices for magnetically detecting a temperature change for thermostat control thereof are disclosed herein. A thermostat control device can be configured to include at least one bi-metallic strip that experiences a change in angular position in response to a temperature change. The thermostat control device is generally associated with a Hall sensor, which includes one or more magnets that experience a movement relative to the Hall sensor and in response to the change in the angular position of the bi-metallic strip. The temperature change can then be automatically and/or electrically detected in response to the movement of the magnets. Thus, the temperature change is utilized for thermostat control thereof.

The Hall sensor can include one or more Hall transistors. Such Hall transistors are associated with the magnet(s) described herein. A change in state of the Hall transistor can thus occur in response to the change in the angular position of the bi-metallic strip. Such a change in state generally comprises a change from a low state to a high state. The thermostat control device is generally associated with a furnace having a power load thereof. Such a thermostat control device can also be associated with microprocessor control circuitry for furnace control thereof.

The output of the Hall sensor can be utilized to accomplish a number of thermostat control operations. For example, the output of the Hall sensor can be coupled to a switching device for shifting the power load of the furnace. For example, coupling of the Hall sensor to the switching device can be accomplished utilizing a relay (e.g., a low current relay) or a coil (e.g., a magnetic reed switch). Additionally, the Hall sensor can be located perpendicular to an opposing magnetic field. The magnets of the Hall sensor can be arranged to include one or more magnets located proximate to one another such that a sudden linear change from a positive gauss to a negative gauss is generally established. The magnets are preferably located on a radial surface of the bi-metallic strip, which can be configured as a coiled bi-metallic strip located within the thermostat control device itself.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
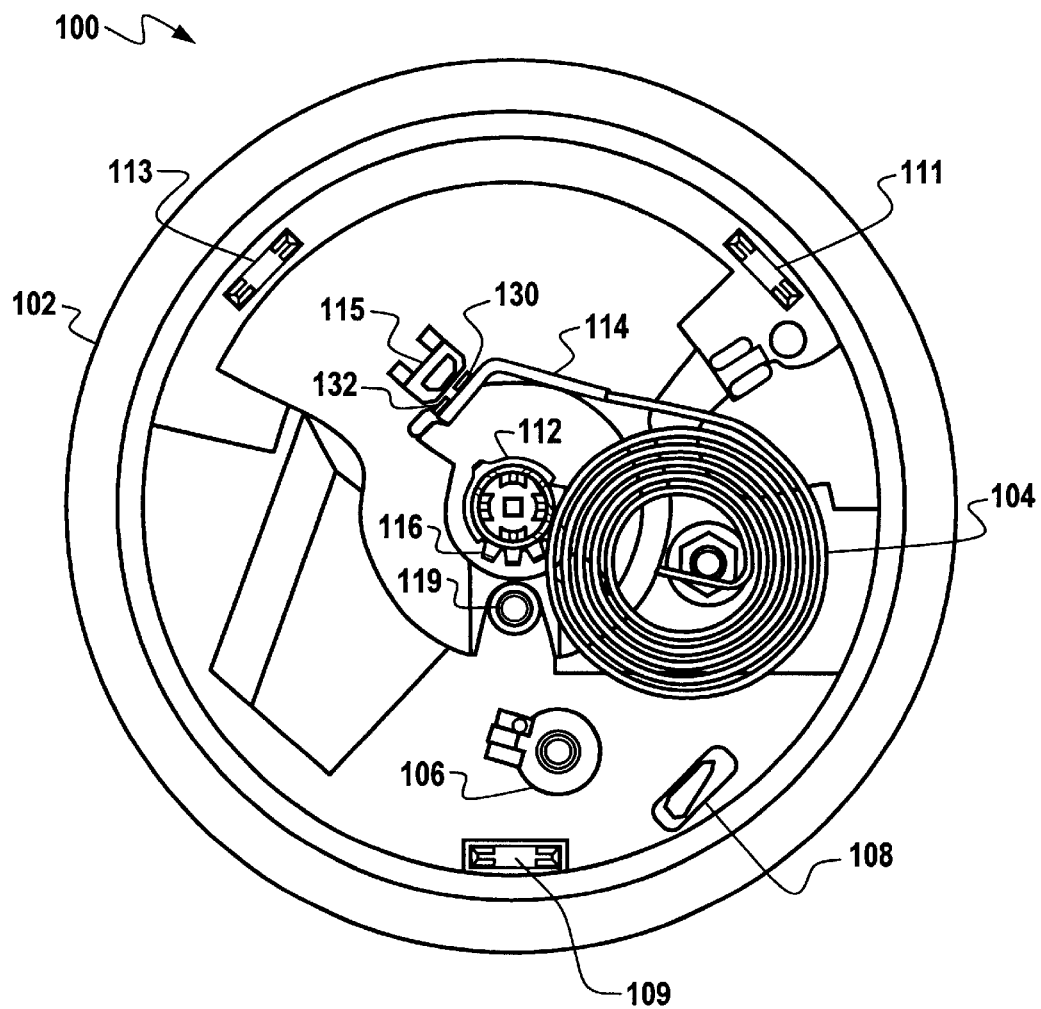
FIG. 1 depicts a top pictorial view of a solid-state thermostat control device in accordance with a preferred embodiment of the present invention.
Figure 2:
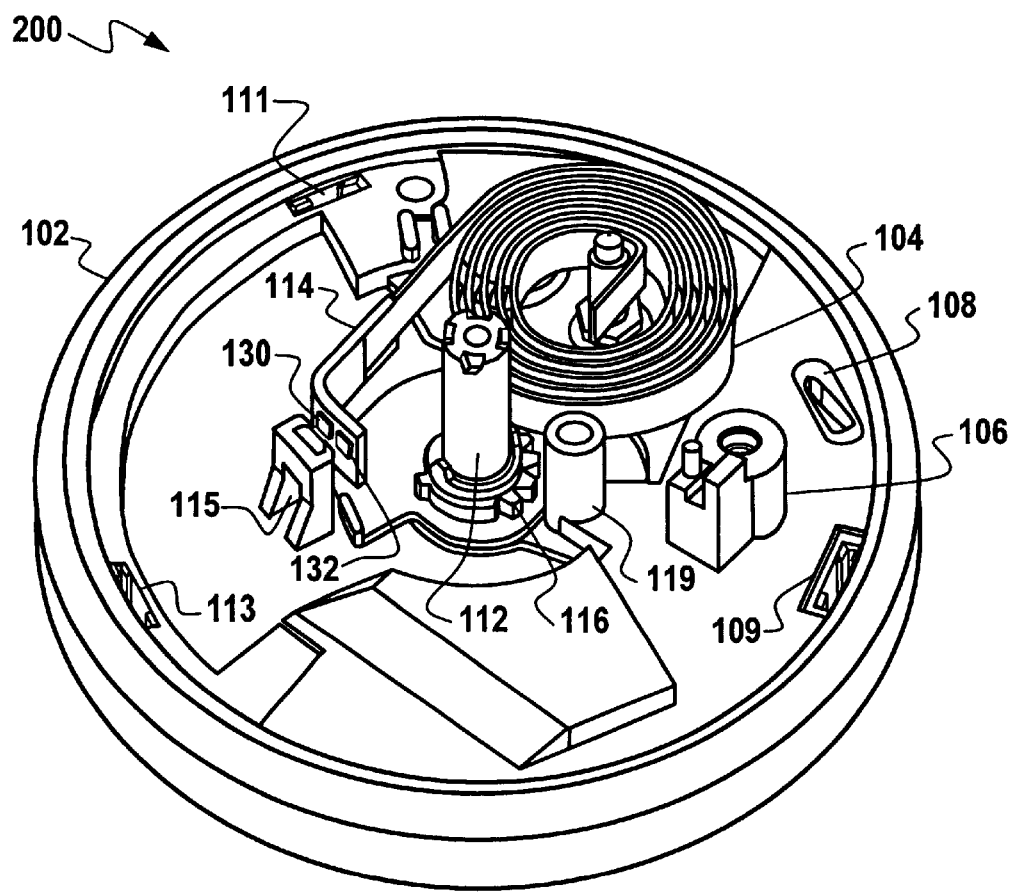
FIG. 2 depicts an isometric perspective view of the solid-state thermostat control device illustrated in FIG. 1 in accordance with a preferred embodiment of the present invention.

FIG. 1 illustrates a top pictorial view of a solid-state thermostat control device 100, which can be implemented in accordance with a preferred embodiment of the present invention. FIG. 2 depicts an isometric perspective view 100 of the solid-state thermostat control device 100 illustrated in FIG. 1 in accordance with a preferred embodiment of the present invention. Thermostat control device 100 can be configured to include a support housing 102 (e.g., a plastic body) and a thermally-sensitive bi-metallic strip 104 that is configured to experience a change in angular position in response to a temperature change.

Bi-metallic strip 104 can be formed from a ferrous material and can be located proximate to a center pivot 112 of a temperature dial (not shown in FIG. 1). As the temperature dial is turned, a gear rack 116 rotates the position of bi-metallic strip 104, which is arranged in the form of a coil. Thus, as the temperature dial turns, the bi-metallic strip 104 also turns. Thermostat control device 100 also includes three snap-on receiving holes 109, 111, and 113, which can receive metal brackets of associated temperature compensation and thermostat circuitry. Those skilled in the art can appreciate that such temperature compensation circuitry is not illustrated or described in detail herein, because such features are extraneous to the present invention, which is directed to a Hall device utilized for temperature control thereof.

Thermostat control device 100 additionally includes a hole 108, which can receive a bracket that supports the aforementioned temperature compensation circuitry. Note that the use of such temperature compensation circuitry is not necessary in accordance with the present invention, because the Hall configuration described herein permits thermostat control device 100 to trip on room temperature air. Thus, hole 108 and snap-on receiving holes 109, 111 and 113 are optional features, which can be utilized in some embodiments of the present invention and may be unnecessary to the implementation of other embodiments of the present invention. Additionally, thermostat control device 100 includes a support rod 119 to which a screw and bracket or other fastener can be connected, which in turn supports the aforementioned temperature compensation circuitry, which, again, may not necessarily be utilized in accordance with a preferred embodiment of the present invention, as indicated above. Thus, support rod 119 is also an optional feature.

A Hall tower 115 holds one or more Hall sensing elements. Hall tower 115 thus generally comprises a Hall sensor in accordance with the present invention. Hall tower 115 and the Hall sensor incorporated therewith are located opposite corresponding two magnets 130 and 132. Magnets 130 and 132 have opposite polarities. For example, magnet 130 can have a south pole facing a north pole of magnet 132, and vice versa, depending upon a desired embodiment of the present invention. Magnets 130 and 132 are supported by a holder 114, which can be formed from a nonferrous material. Holder 114 is preferably formed from a nonferrous material because of the general proximity of bi-metallic strip 104 to magnets 130 and 132. Thus, holder 114 not only holds magnets 130 and 132, but also servers to magnetically separate magnets 130 and 132 from bi-metallic strip 104.

Thermostat control device 100 is generally associated with the Hall sensor maintained by Hall tower 115, which responds to the change of a magnetic field as influenced by the presence or absence of a ferromagnetic target object of a designed shape passing by the sensory field of the magnetic effect sensor (i.e., the Hall sensor). The Hall sensor incorporated with Hall tower 115 can provide an electrical output signal, which can be further modified as necessary by subsequent electronics to yield appropriate sensing and control information thereof. Associated electronics can be either onboard or outboard of the Hall sensor package (i.e., Hall tower 115) itself.

The Hall sensor utilized in association with the present invention is generally associated with two or more magnets 130 and 132 that experience a movement relative to the fixed Hall sensor (i.e., Hall tower 115) in response to the change in the angular position of the bi-metallic strip 104. The temperature change can then be automatically and/or electrically detected in response to the movement of the magnets. It is this very temperature change that is utilized for thermostat control in, for example, a heating or cooling system of a house, office, or other building.

The Hall sensor can be configured to include a Hall transistor associated with one or more magnets 130 and 132. A change in state of the Hall transistor can occur in response to the change in the angular position of the bi-metallic strip 104. Such a change in state generally comprises a change from a low state to a high state. Thermostat control device 100 can also be linked to a furnace (not shown) or cooling system having a power load thereof. An example of such a furnace is an HVAC furnace utilizing in HVAC heating and cooling systems. Such an HVAC furnace can be equipped with an HVAC furnace board that includes a thermostat relay that connects to the full speed power input terminal when there is a call for air conditioning, and to the second or heating terminal when there is a call for heat. An output of the Hall sensor can be coupled to a switching device for shifting the power load of the furnace or cooling system. Coupling of the Hall sensor within Hall tower 115 to the switching device can be accomplished utilizing, for example, a relay (e.g., a low current relay). Such a coupling can also be accomplished utilizing a coil such as a magnetic reed switch.

Additionally, the Hall sensor can be located perpendicular to an opposing magnetic field. The magnets of the Hall sensor can be arranged to include one or more magnets located proximate to one another such that a sudden linear change from a positive gauss to a negative gauss is generally established. The magnets 130 and 132 are preferably located on a radial surface of the bi-metallic strip, which can be configured as a coiled bi-metallic strip located within the thermostat control device itself.

Figure 3:
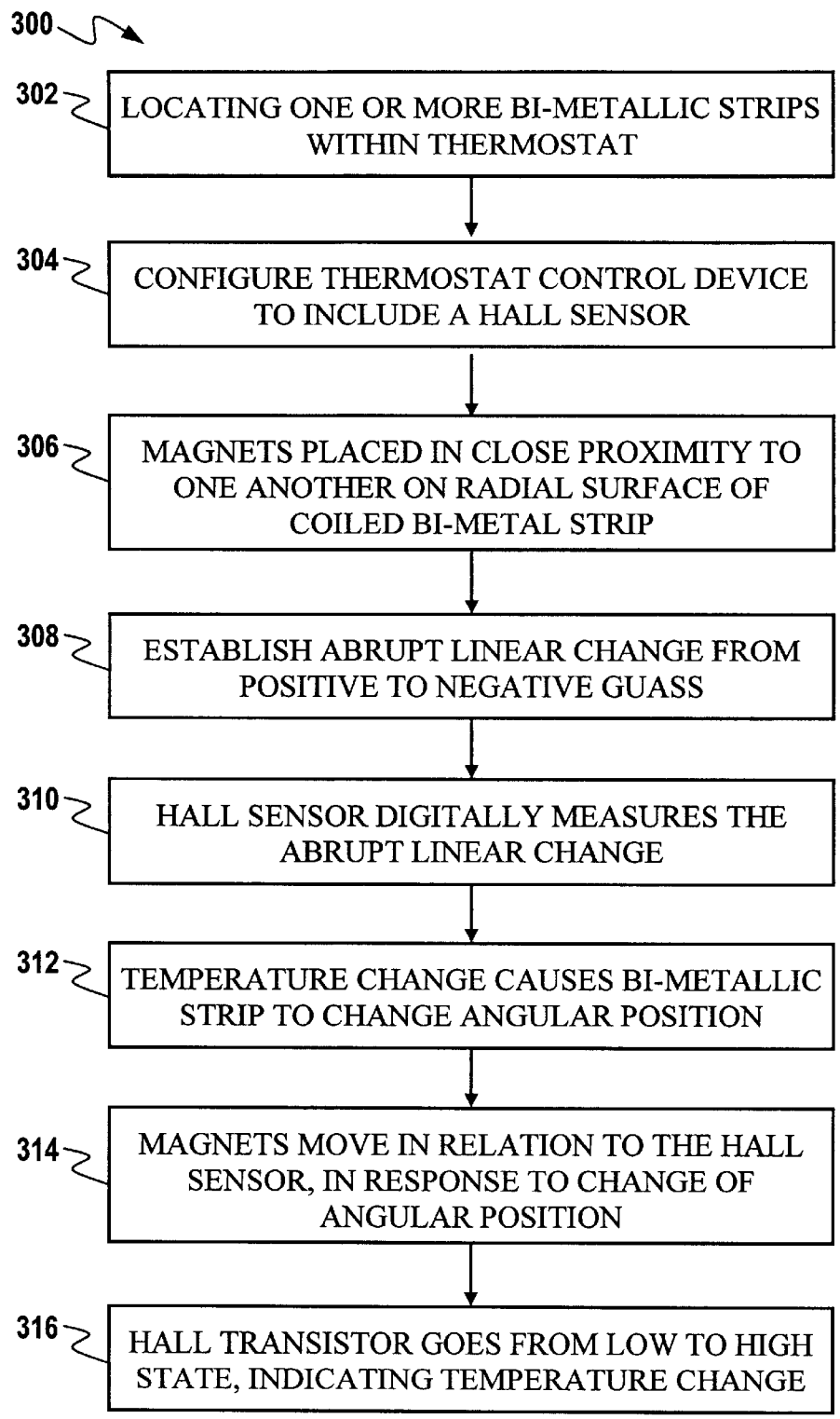
FIG. 3 depicts a high-level flow chart of operations depicting a general methodology for implementing a thermostat control device in accordance with a preferred embodiment of the present invention.

FIG. 3 illustrates a high-level flow chart 300 of operations depicting a general methodology for implementing a thermostat control device, in accordance with a preferred embodiment of the present invention. A thermostat control device, such as the thermostat control device 100 depicted in FIGS. 1 and 2, can be configured to include one or more bi-metallic strips, as indicated at block 302. The thermostat control device generally includes a thermostat within which the bi-metallic strip can be located. As illustrated thereafter at block 304, the thermostat control device can also be configured to include a Hall sensor. The thermostat control device described herein can comprise at least one magnet, as indicated at block 306, which are placed in close proximity to each other such that, as illustrated at block 308, an abrupt linear change from a positive gauss to a negative gauss is established. For example, two or more magnets placed close to one another can provide this abrupt linear change to provide thermostat-switching capabilities thereof.

A single magnet can also be utilized to provide such switching capabilities in association with one or more Hall sensors and a bi-metallic strip. Still, it can be appreciated that additional magnetic configurations can also be implemented in accordance with the present invention. For example, three magnets can be arranged with opposing magnetic field, in association with one or more Hall sensors detecting a narrow peak of positive gauss. Additionally, the magnets are generally located on a radial surface of the bi-metallic strip (i.e., a coiled bi-metallic strip) as depicted at block 306. As indicated at block 310, the Hall sensor can digitally measure the abrupt linear change from positive to negative gauss, because the Hall sensor is positioned perpendicular to an opposing magnetic field. Note that the Hall sensor also includes one or more Hall transistors, as described earlier. Thereafter, as depicted at block 312, a change of temperature indicated by the thermostat causes the bi-metallic strip to change angular position, which in turn causes the magnets to move in relation to the Hall sensor, as illustrated at block 314. This movement causes a change in the state of the Hall transistor to go from a low state to a high state, as illustrated at block 316 whenever the bi-metallic strip indicates a temperature difference.

Thus, according to the present invention, a thermostat can be configured to include one or more bi-metallic strips that experience a change in angular position in response to a temperature change associated with the thermostat. The thermostat is generally associated with a Hall sensor, which includes a plurality of magnets that experience a movement relative to the Hall sensor in response to the change in the angular position of the bi-metallic strip. The temperature change can then be automatically and/or electrically detected in response to the movement of the magnets, wherein the temperature change is utilized for thermostat control thereof.

The present invention thus utilizes a Hall magnetic sensor principle by incorporating at least two magnets in close proximity to each other such that an abrupt linear change from a positive to negative gauss can be established. The Hall sensor can measure this abrupt linear change digitally, which is located perpendicular to the opposing magnetic field. The sensing magnetic relationship can be constructed by locating the magnets of the Hall sensor on a radial surface of a coiled bi-metallic strip, which is located in the thermostat. The change of temperature causes the bi-metallic strip to change angular position, thereby forcing the magnets to move in relation to the fixed Hall sensor. This movement causes a change in the state of the Hall transistor from a low to a high state whenever the bi-metallic strip indicates a temperature difference. The output of the Hall sensor can then be coupled to and/or integrated with a switching device that shifts the high power load of the furnace. This can be accomplished utilizing several coupling techniques, including a low current relay, a coil whose energy can be used to push the contacts of a switch over dead center or a coil operating a magnetic reed switch.

The present invention presents a number of advantages due to the utilization of a Hall sensor for thermostat control applications, such as hearing and cooling systems associated with offices and buildings. The present invention is unique because the Hall sensor can operate with a very low supply current compared to other electronic sensor control methods and devices. The output of a Hall sensor can be approximately 20 mÅ, which is strong enough to drive a coil (e.g., a bi-metallic coil) with the extra energy required to close the contacts of a switch, thereby supplying high power switching capabilities needed to make the thermostat control device disclosed herein useful.

This type energy, however, is not available from the mechanical configuring of the bi-metallic strip alone. Those skilled in the art can appreciate that historically power "stealing" from a furnace circuit is a problem in 10% of applications where electronic thermostats are employed. The method and apparatus disclosed herein would require only several microamps (10–100 uÅ) of current to operate, thus rendering the power stealing issue moot.

Some thermostat control devices in use today operate via a bi-metallic strip that changes angularity with temperature, thereby tilting a mercury switch so the mercury can move to make or break contacts using mercury's self leveling nature. One of the major problems with these types of devices is that mercury is a bad environmental and human hazard and legislation through the United States and across many other countries is currently being drafted to ban its use. As explained previously, other solutions involved replacing the mercury or utilizing metallic spheres rollably located in a glass tube so that the spheres come in contact with switch electrodes, imitating a mercury switch. These attempts failed due to temperature accuracy and contact closure problems.

Other attempts involved the replacement of the mercury switch itself with a reed switch. This approach also suffered from accuracy problems. The accuracy requirement of an efficient thermostat control device demands that such a device operates within a degree and a half. The present invention described herein is capable of approximately 50% higher accuracy and solves the aforementioned problems by replacing the mercury switch with a Hall-switching device. The contact closure method described above is also met electronically by incorporating a relay and/or coil/mechanical switch. The present invention eliminates the need for a mercury switch by replacing the switching and temperature sensing functions with an electro-mechanical solution.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A method for magnetically detecting a temperature change for thermostat control thereof, said method comprising the steps of:

configuring a thermostat control device to include a thermostat and at least one bi-metallic strip that is configured to experience a change in angular position in response to a temperature change;

associating said thermostat control device with a Hall sensor comprising a plurality of magnets, wherein said plurality of magnets can experience a movement relative to said Hall sensor in response to said change in said angular position of said at least one bi-metallic strip; and automatically detecting said temperature change in response to said movement of said plurality of magnets, thereby utilizing said temperature change for thermostat control thereof.

2. The method of claim 1 further comprising the step of: electrically detecting said temperature change in response to said movement of said plurality of magnets.

3. The method of claim 1 further comprising the step of: configuring said Hall sensor to further comprise at least one Hall transistor associated with said plurality of magnets.

4. The method of claim 3 further comprising the step of: initiating a change in state of said Hall transistor in response to said change in said angular position of said bi-metallic strip, wherein said change in state comprises a change from a low state to a high state.

5. The method of claim 1 further comprising the step of: associating said thermostat control device with a furnace having a power load thereof; and
coupling an output of said Hall sensor to a switching device for shifting said power load of said furnace.

6. The method of claim 5 further comprising the step of: coupling said output of said Hall sensor to said switch utilizing a relay.

7. The method of claim 6 wherein said relay comprises a low current relay.

8. The method of claim 5 wherein the step of coupling an output of said Hall sensor to a switching device for shifting said power load of said furnace, further comprises the step of:
coupling an output of said Hall sensor via a coil to a switching device for shifting said power load of said furnace.

9. The method of claim 8 wherein said coil comprises a magnetic reed switch.

10. A method for magnetically detecting a temperature change for thermostat control thereof, said method comprising the steps of:
configuring a thermostat control device to include a thermostat and at least one bi-metallic strip that is configured to experience a change in angular position in response to a temperature change thereof, wherein said at least one bi-metallic strip comprises a coiled bi-metallic strip located within said thermostat control device;
associating said thermostat control device with a Hall sensor comprising at least one magnet thereof, wherein said at least one magnet can experience movement relative to said Hall sensor in response to said change in said angular position of said at least one bi-metallic strip and wherein said Hall sensor is located perpendicular to an opposing magnetic field;
locating said at least one magnet on a radial surface of said at least one bi-metallic strip;
automatically detecting said temperature change in response to said movement of said at least one magnet, thereby utilizing said temperature change for thermostat control thereof;
associating said thermostat control device with a furnace having a power load thereof and associated microprocessor control circuitry; and
coupling an output of said Hall sensor to a switching device for shifting said power load of said furnace and to said associated microprocessor control circuitry.

11. An apparatus for magnetically detecting a temperature change for thermostat control thereof, said apparatus comprising:
a thermostat control device that comprises a thermostat and at least one bi-metallic strip that is configured to experience a change in angular position in response to a temperature change thereof;
a Hall sensor associated with said thermostat control device, wherein said Hall sensor comprises a plurality of magnets, which can experience movement relative to said Hall sensor in response to said change in said angular position of said at least one bi-metallic strip; and
wherein said Hall sensor automatically detects said temperature change in response to said movement of said plurality of magnets, thereby utilizing said temperature change for thermostat control thereof.

12. The apparatus of claim 11 wherein said temperature change is electrically detected in response to said movement of said plurality of magnets.

13. The apparatus of claim 11 wherein said Hall sensor comprise at least one Hall transistor associated with said plurality of magnets.

14. The apparatus of claim 13 wherein a change in state of said Hall transistor is initiated in response to said change in said angular position of said bi-metallic strip, wherein said change in state comprises a change from a low state to a high state.

15. The apparatus of claim 11 further comprising:
said thermostat control device associated with a furnace having a power load thereof; and
an output of said Hall sensor coupled to a switching device for shifting said power load of said furnace.

16. The apparatus of claim 15 wherein said output of said Hall sensor is coupled to said switch utilizing a relay.

17. The apparatus of claim 16 wherein said relay comprises a low current relay.

18. The apparatus of claim 15 an output of said Hall sensor is coupled via a coil to a switching device for shifting said power load of said furnace.

19. The apparatus of claim 18 wherein said coil comprises a magnetic reed switch.

20. An apparatus for magnetically detecting a temperature change for thermostat control thereof, said apparatus comprising:
a thermostat control device comprising a thermostat and at least one bi-metallic strip that is configured to experience a change in angular position in response to a temperature change, wherein said at least one bi-metallic strip comprises a coiled bi-metallic strip located within said thermostat control device;
a Hall sensor associating said thermostat control device wherein said Hall sensor comprises at least one magnet thereof, such that said at least one magnet can experience movement relative to said Hall sensor in response to said change in said angular position of said at least one bi-metallic strip and wherein said Hall sensor is located perpendicular to an opposing magnetic field;
said at least one magnet located on a radial surface of said at least one bi-metallic strip;
wherein said Hall sensor automatically detects said temperature change in response to said movement of said at least one magnet, thereby utilizing said temperature change for thermostat control thereof;
said thermostat control device associated with a furnace having a power load thereof and associated microprocessor control circuitry; and
an output of said Hall sensor coupled to a switching device for shifting said power load of said furnace and to said associated microprocessor control circuitry.

* * * * *